Feb. 12, 1952

SARAH STORRIE
KNOWN AS
SARAH HORNE
HOT AND COLD WATER SUPPLY FITTING 2,585,184

Filed July 5, 1949

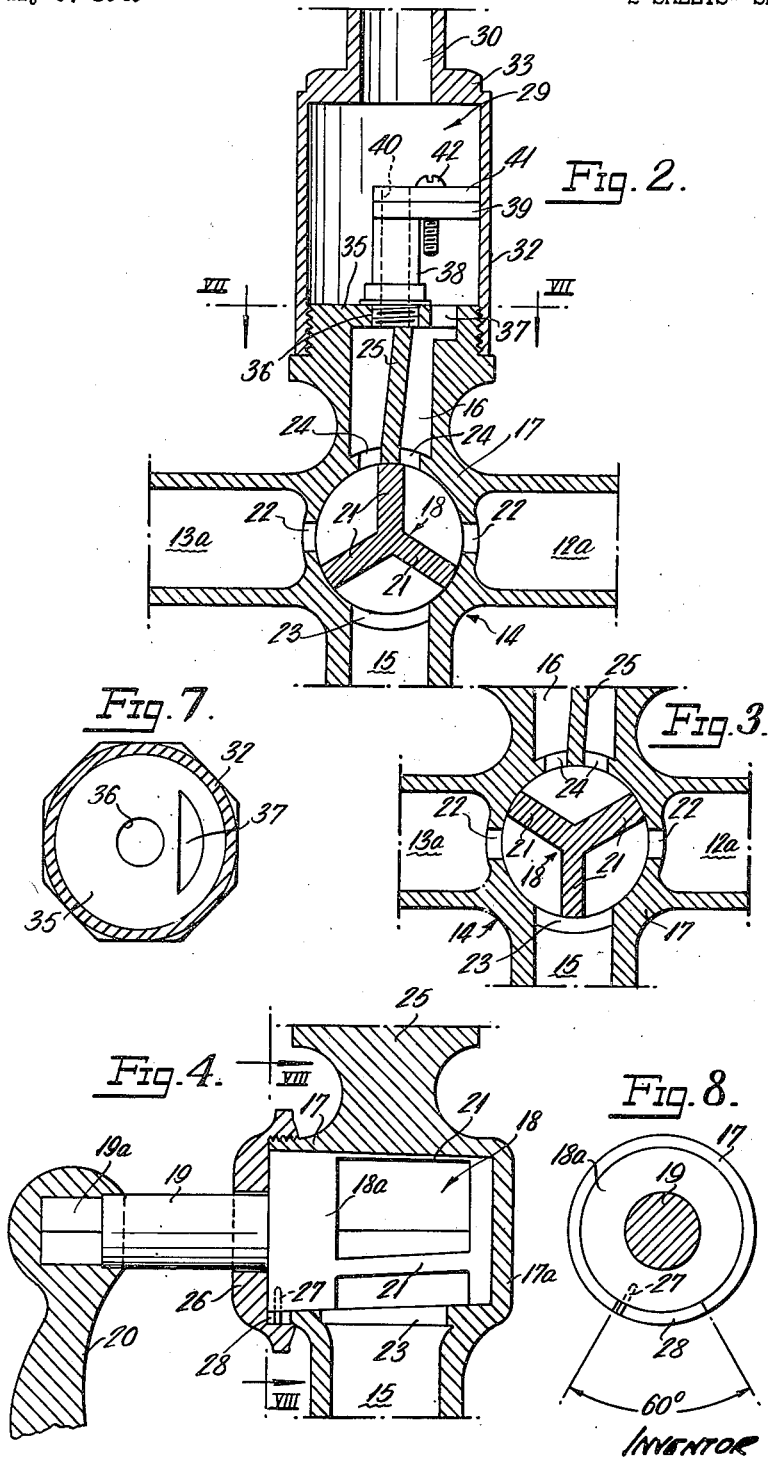

Patented Feb. 12, 1952

2,585,184

UNITED STATES PATENT OFFICE 2,585,184

HOT AND COLD WATER SUPPLY FITTING

Sarah Storrie, known as Sarah Horne,
Edinburgh, Scotland

Application July 5, 1949, Serial No. 103,066
In Great Britain July 5, 1948

6 Claims. (Cl. 137—69)

This invention relates to hot and cold water supply fittings, particularly for use where the cold water supply is obtained direct from the supply main, and relates to fittings of the kind comprising a hot water tap, a cold water tap, a four-way branch member having two of the branches connected to the hot and cold water taps respectively and in which the other two branches communicate with outlet connections, the junction of the four branches incorporating a housing for a control valve which regulates the supply of hot and/or cold water to the outlet connections, one of which may be arranged, for example, to supply a bath, basin, sink or the like, while the other outlet connection is arranged to supply a spraying nozzle for use as an overhead shower or as a hairdresser's fitting or the like.

The object of the present invention is to provide an improved construction of fitting of the kind above described which obviates the possibility of accidental flooding of the apartment in which the fitting is installed, which will operate satisfactorily on equal or unequal hot and cold water supply pressures, and which is simple in operation.

According to the present invention, in fittings of the kind described the control valve is located in a housing provided with diametrically-opposite hot and cold water inlet ports respectively, an intermediate combined hot and cold water outlet port to the bath, sink, basin or the like, and separate hot and cold water outlet passages separated by a partition diametrically opposite said intermediate port and arranged for connection to the spraying nozzle, said control valve being in the form of a rotary plug valve having three equally spaced radial wings or vanes and movable through a limiting angle of approximately 60 degrees from one extreme position in which one of said radial wings is positioned centrally of the said intermediate port, in which position the hot and cold water branches discharge only into the said intermediate port, to another extreme position in which one of said wings registers with the said partition between the separate hot and cold water outlet passages, in which position the hot water branch discharges only into the hot water outlet passage and the cold water branch discharges only into the cold water outlet passage.

By this arrangement, movement of the valve between the two extreme positions regulates the relative proportions of hot and cold water supplied either to the intermediate outlet port or to the said hot and cold water outlet passages, but is not relied upon to shut-off the supplies of hot and cold water, control thereof being effected by the hot and cold water taps of the fitting.

A further feature of the invention consists in the combination with the said hot and cold water outlet passages of a mixing chamber into one end of which said outlet passages open, the cold water passing through a tube which opens through an outlet orifice into the said mixing chamber, and the hot water entering said mixing chamber and passing around said tube. The hot and cold water mix in the exit end of said mixing chamber and pass out therefrom through an outlet connection adapted to be connected to the spraying nozzle.

According to a further feature of the invention the outlet orifice at the outer end of said tube is regulated by the provision of a rotatable disc eccentrically mounted on the tube and having a series of apertures of different sizes therein selectively registrable with the outlet orifice in the tube by angular adjustment of the said disc.

A preferred embodiment of the present invention will now be particularly described with reference to the accompanying drawings in which—

Fig. 1 shows, in elevation, a general arrangement of the water supply apparatus.

Fig. 2 shows a vertical transverse cross-section through the valve and mixing chamber, the valve being shown in a position for admitting hot and cold fluid to the mixing chamber.

Fig. 3 shows a cross-section similar to that shown in Fig. 2, but with the valve in a position for admitting fluid to the combined hot and cold fluid outlet.

Fig. 4 shows a longitudinal cross-section through the valve chamber with the valve in the position shown in Fig. 2.

Fig. 5 shows an isometric view of the valve.

Fig. 6 shows an isometric view of the regulating device shown in Fig. 2.

Fig. 7 shows a cross-section on the line VII—VII in Fig. 2.

Fig. 8 shows a cross-section on the line VIII—VIII in Fig. 4.

Referring now to the drawings, the hot and cold water supply apparatus, indicated generally at 10, comprises a hot water inlet pipe 12 controlled by a tap H and a cold water inlet pipe 13 controlled by a tap C. The taps H and C are provided with branches 12a and 13a respectively which form part of a four-way branch member 14 having a lower outlet branch 15 for supplying a bath, basin, sink or the like and an upper outlet branch 16 arranged to supply a spraying nozzle for use as an overhead or flexibly coupled shower fitting.

A housing 17, in which a rotary control valve 18 is located, forms the junction of the four branches 12a, 13a, 15 and 16 of the four-way branch member 14, the disposition of the branches being such that the hot and cold inlet branches 12a and 13a are horizontal and diametrically opposite one another and the outlet branches 15 and 16 are at right angles to the inlet branches 12a and 13a and likewise diametrically opposed.

The control valve 18 (Figs. 4 and 5) comprises a tapered plug member 18a and an actuating spindle 19 adapted to be manually operated by means of a control handle 20 secured to a square-shank end 19a of the spindle 19. The valve 18 is provided, intermediate of the ends of the plug member 18a, with three equally spaced radial wings or vanes 21 adapted, when the control valve 18 is rotated, to control the direction of flow of hot and cold water passing to the interior of the housing 17 from the inlets 12 and 13. The housing 17 is provided with inlet and outlet ports to the four branches 12a, 13a, 15 and 16 such that the inlet branches 12a and 13a open into the housing 17 through inlet ports 22, and the outlet branch 15 opens into the housing 17 through outlet port 23. The outlet branch 16 opens into the housing 17 through a pair of outlet ports 24 separated from each other by a partition 25 extending the full internal bore of the branch 16. A gland nut 26 is secured to the open end of the housing 17, the other end of which is closed by a wall 17a, and serves to prevent movement of the control valve 18 in an axial direction. Rotary movement of the control valve 18 is limited by means of a stop-pin 27 secured to the plug member 18a and working in a fixed slotted guideway 28 formed in the open end of the housing 17. In order to limit the rotational movement of the control valve 18 to approximately 60 degrees from one extreme position to the other, the guideway 28, as shown in Fig. 8, is of such a length as to define such a limited movement.

The control valve 18 is shown in Figs. 2 and 4 in one extreme position where one of the vanes 21 is in register with the partition 25 and the other vanes 21 are between the inlet ports 22 and the outlet port 23. Thus it will readily be seen that hot and cold water flowing into the housing 17 from the inlet branches 12a and 13a will flow through the inlet ports 22 and out of the housing 17 through the pair of outlet ports 24 into the branch 16. In this position of the control valve 18 the outlet port 23 is entirely closed.

Fig. 3 shows the control valve 18 in the other extreme position where one of the vanes 21 is positioned substantially centrally of the outlet port 23 and the other vanes 21 are between the inlet ports 22 and the pair of outlet ports 24. In this position of the control valve 18 no flow of water from the inlet branches 12a and 13a will pass to the outlet branch 16; instead, the branch 16 is entirely closed and all the fluid from the branches 12a and 13a will pass into the housing 17 and through the outlet port 23 and outlet branch 15. It will be understood that both hot and cold water, either singly or together, may be fed into the housing 17 at any one time.

The outlet branch 16 is provided with a mixing chamber 29, Figs. 1, 2 and 7, in which the hot and cold water from the inlet pipes 12 and 13 may combine together before passing out of the chamber 29, through an outlet connection 30, to a flexible pipe 31 connecting a spraying device to the apparatus. The chamber 29 comprises a cylindrical tube 32 having screw-threaded connection at one end to the outlet branch 16 and, at the other end, provided with a flatted external region 33 for tightening the tube 32 on the branch 16. A forked rest arm 34 may be secured to the outlet connection 30 for supporting a spraying device.

A base platform 35 is provided in the mixing chamber 29 and separates the latter from the outlet branch 16. A threaded bore 36 is formed in the base platform 35 through which cold water may flow from one side of the partition 25, and a meniscus-shaped passage 37 is also provided in the base platform 35 through which hot water may pass from the other side of the partition 25.

Means are provided on the base platform 35 for varying, as desired, the rate of flow of cold water entering the mixing chamber 29 through the bore 36 relatively to the flow of hot water entering the mixing chamber 29 through the passage 37. As shown in Figs. 2 and 6, a tube 38 is in screw-threaded connection at one end with the threaded bore 36 and a fixed plate 39 is eccentrically mounted on the other end of the tube 38. Both the tube 38 and the fixed plate 39 are provided with an outlet passage 40 extending therethrough. A rotatable disc 41 is secured, by means of a screw 42, over the fixed plate 39, said disc 41 being provided therein with a series of apertures 43 of different sizes selectively registrable with the passage 40 by angular adjustment of the disc 41. The largest aperture 43 has a diameter the same or substantially the same as that of the outlet passage 40. A resilient washer may be fitted between the fixed plate 39 and the rotatable disc 41, this washer having an aperture therein registering with the outlet passage 40. The purpose of the tube 38 and disc 41 is to provide means for varying the rate of flow of cold water into the mixing chamber 29 to suit the hot and cold water pressures of the particular installation in which the apparatus is incorporated. By selecting any one of the apertures 43 and positioning it in register with the passage 40, the rate of flow of cold water entering the mixing chamber 29 may be varied according to the pressures in the cold water and hot water mains. The tube 38 is preferably centrally located in the mixing chamber 29.

In practice cold water will pass through the passage 40 and apertured disc 41 and hot water will pass through the meniscus-shaped passage 37 into the mixing chamber 29 and flow around the tube 38. The high pressure of the cold water flow will tend to induce the hot water into the mixing chamber 29 and thus ensure a steady and controlled flow of water through the apparatus. The flexible pipe 31 permits the tube 32 to be unscrewed from the branch 16 should it be desired to adjust the disc 41 in order to bring a different aperture in the disc 41 into register with the bore of the tube 38. This may be necessary if it is found that the prevailing pressure in the cold water main induces at the outlet through the disc 41 too great or an insufficient flow of hot water into the mixing chamber 29.

I claim:

1. A hot and cold water supply fitting comprising a branch member having a pair of aligned horizontal hot and cold water inlet branches respectively, a pair of aligned vertical outlet branches at right angles to said inlet branches, and a valve housing at the junction of said inlet and outlet branches, a valve rotatable in said housing and adapted in one position to open said inlet branches to the upper branch only of said outlet branches and in another position to open said inlet branches to the lower branch only of said outlet branches, a partition extending through the upper outlet branch and dividing it into separate hot and cold water passages leading out from said valve housing, and a mixing chamber communicating with the outer end of said upper outlet branch.

2. A hot and cold water supply fitting as claimed in claim 1 including a vertical tube within the mixing chamber, the lower end of said tube communicating with the cold water passage in the upper outlet branch and the upper end of said tube opening into the upper part of said mixing chamber.

3. A hot and cold water supply fitting as specified in claim 1 in which the control valve is in the form of a rotary plug valve having three equally spaced radial vanes, said control valve being movable through a limiting angle of approximately sixty degrees from one extreme position in which hot and cold water entering the valve housing from the inlet branches is directed by said vanes into the lower outlet branch, to another extreme position in which one of the radial wings of the valve registers with said partition, when hot water entering the valve housing from the hot water inlet branch is directed by said valve into the hot water passage and cold water entering the valve housing from the cold water inlet is directed into the cold water passage in said mixing chamber.

4. A hot and cold water supply fitting comprising a branch member having a pair of aligned horizontal hot and cold water inlet branches respectively, a pair of aligned vertical outlet branches at right angles to said inlet branches, and a valve housing at the junction of said inlet and outlet branches, a valve rotatable in said housing and adapted in one position to open said inlet branches to the upper branch only of said outlet branches and in another position to open said inlet branches to the lower branch only of said outlet branches, a partition extending through the upper outlet branch and dividing it into separate hot and cold water passages leading out from said valve housing, a mixing chamber communicating with the outer end of said upper outlet branch, a vertical tube within the mixing chamber, the lower end of said tube communicating with the cold water passage in the upper outlet branch and the upper end of said tube opening into the upper part of said mixing chamber, and said control valve being constituted by three equally spaced radial vanes, and being movable into a position in which one of said vanes is registrable with said partition when the other vanes of said valve cut off communication between the inlet branches and the lower outlet branch and open communication between the cold water inlet branch and the lower end of the mixing chamber and between the hot water inlet branch and the lower end of said tube.

5. A hot and cold water supply fitting comprising a branch member having a pair of aligned horizontal hot and cold water inlet branches respectively, a pair of aligned vertical outlet branches at right angles to said inlet branches, and a valve housing at the junction of said inlet and outlet branches, a valve rotatable in said housing and adapted in one position to open said inlet branches to the upper branch only of said outlet branches and in another position to open said inlet branches to the lower branch only of said outlet branches, a partition extending through the upper outlet branch and dividing it into separate hot and cold water passages leading out from said valve housing, a mixing chamber communicating with the outer end of said upper outlet branch, a vertical tube within the mixing chamber, the lower end of said tube communicating with the cold water passage in the upper outlet branch and the upper end of said tube opening into the upper part of said mixing chamber, and a rotatable disc eccentrically mounted on the upper end of said tube, said disc having an annular series of spaced apertures of different sizes therein selectively registrable with the upper end of said tube by angular adjustment of said disc.

6. A hot and cold water supply fitting comprising a branch member having a pair of aligned horizontal hot and cold water inlet branches respectively, a pair of aligned vertical outlet branches at right angles to said inlet branches, and a valve housing at the junction of said inlet and outlet branches, a valve rotatable in said housing and adapted in one position to open said inlet branches to the upper branch only of said outlet branches and in another position to open said inlet branches to the lower branch only of said outlet branches, a partition extending through the upper outlet branch and dividing it into separate hot and cold water passages leading out from said valve housing, a mixing chamber communicating with the outer end of said upper outlet branch, a vertical tube within the mixing chamber, the lower end of said tube communicating with the cold water passage in the upper outlet branch and the upper end of said tube opening into the upper part of said mixing chamber, a fixed disc eccentrically secured to the upper end of said tube, said disc having an opening therethrough which registers with the outlet end of the bore of said tube, and a rotatable disc concentrically mounted on said fixed disc and having an annular series of spaced apertures of different sizes therein selectively registrable with the opening in said fixed disc.

SARAH STORRIE,
*Known as Sarah Horne.*

REFERENCES CITED

The following references are of record in the file of this patent:

UNITED STATES PATENTS

| Number | Name | Date |
|---|---|---|
| 859,264 | Travis | July 9, 1907 |
| 1,005,549 | Jacobsen | Oct. 10, 1911 |

FOREIGN PATENTS

| Number | Country | Date |
|---|---|---|
| 48,482 | Sweden | of 1921 |
| 49,342 | Norway | of 1931 |
| 498,834 | Great Britain | of 1939 |